United States Patent [19]

White

[11] 4,284,843
[45] Aug. 18, 1981

[54] REPEATING STATION FOR USE IN DIGITAL DATA COMMUNICATIONS LINK

[75] Inventor: Emery A. White, Roanoke, Va.

[73] Assignee: General Electric Company, Salem, Va.

[21] Appl. No.: 37,834

[22] Filed: May 10, 1979

[51] Int. Cl.³ ............................................ H04L 25/02
[52] U.S. Cl. ................................. 178/69 G; 178/71 T
[58] Field of Search ................ 178/69 N, 69 G, 71 T, 178/71 R, 70 R

[56] References Cited

U.S. PATENT DOCUMENTS

| 2,839,605 | 6/1958 | Ridler et al. | 178/71 R |
| 3,410,957 | 11/1968 | Schiebeler | 178/71 R |
| 3,873,775 | 3/1975 | Chown | 178/71 T |

*Primary Examiner*—Marshall M. Curtis
*Attorney, Agent, or Firm*—Arnold E. Renner

[57] ABSTRACT

A repeater for use in a data communications link, particularly of the type to provide the exchange of process control information with external controlled equipment, includes a detector for detecting incoming data presented on the data communications link. Through the use of a free running internal clock, the data is retimed, reconstructed through the use of a modulator and presented to a transmitter for placement back on the data link. The repeater further provides data and clock signals to the external controlled equipment and receives signals from that equipment which serve, by way of logic circuitry within the repeater, to effect the modification of the data received by the repeater to thus enable the controlled equipment to communicate with other elements connected to the link.

17 Claims, 10 Drawing Figures

REPEATING STATION FOR USE IN DIGITAL DATA COMMUNICATIONS LINK

BACKGROUND OF THE INVENTION

The present invention relates generally to digital data communication links and more particularly to a repeater for use in serial data communication links, said repeater also having the capability of modifying the serial data stream as the stream is processed by the repeater so that bidirectional communication with external equipment is possible.

The use of repeating stations, or repeaters, in data communications is well known. Such stations are required for several reasons including the need for providing bidirectional communications with external equipment. Information placed on the link and directed to an equipment must have a terminal point with which that equipment can communicate. If communication is to be bidirectional, some means of originating information to be placed on the link must also exist. The repeater can be structured to serve these functions. Often, particularly when serial transmission of data is used, this communication is achieved by changing the status of individual data bits in a message frame. As an example, if a particular external equipment desires to communicate with a control computer, the equipment may be required to change the binary status of a particular bit to set a "flag" indicating that communication is desired. The computer will subsequently respond to this indication or flag in accordance with the overall system programming. Another example of change communication is the inversion of a particular field of the message frame to indicate operational status of the link or of a particular piece of equipment on the link.

In addition to the communication function, repeaters are employed in communication data links to preserve the intelligibility of the transmitted data. This is especially true and necessary when the link is long thus resulting in high signal attenuation and increasing the probability of noise being introduced onto the link and hence into the data stream.

Prior art repeaters for digital data communication links are largely of a synchronous nature. Such repeaters tend to be relatively expensive and to require a considerable amount of time to achieve synchronism. By far the most common form of repeater of this type is that which employs a phase lock loop. Although digital phase lock loops are known, the analog form of phase lock loop is much more common than that which is customarily used. Such circuits are expensive, are much more susceptible to operational variances due to temperature, component aging, etc. than purely digital circuits and also normally require additional adjustments in the field to maintain proper operation. In addition, the phase lock loop system requires a considerable amount of time to achieve synchronism. Typically, ten to twenty data bits are used to bring the system into synchronization prior to any attempt to transmit actual data. The embodiment of this invention establishes synchronism in a fraction of a bit time.

SUMMARY OF THE INVENTION

It is, therefore, an object of the present invention to provide an improved repeating station or repeater for use in a digital data communications link.

It is another object to provide an improved entirely digital repeater for use in digital data communications.

It is a further object to provide a repeater for a data communications link which does not require frequency or threshhold adjustments over moderate distances, typically one mile.

It is still another object to provide a data communication link repeating station employing a free running internal clock for reconstructing serially received digital data for placement on the link.

It is a still further object to provide a digital repeater which includes circuitry for modifying a received message to thereby permit bidirectional communications.

It is an additional object to provide a digital repeating station which does not require continuous synchronization between the incoming and the outgoing messages.

These objects are achieved in accordance with the present invention by providing, in the repeater, detecting means for receiving the incoming signal and to provide data signals which are representative thereof. A free running internal clock is also included to supply clock signals to retiming logic for the generation of timing signals. A modulation means responsive to the data signals and the timing signals serves to reconstruct the incoming digital data in a time relationship governed by the clock signals to thereby provide the reconstructed digital data message. This message is then provided to a transmitting means for transmission on the communications link. In accordance with the preferred embodiment, the repeater of the present invention further includes means responsive to externally supplied inverting signals to selectively modify and reconstruct the data message so that bidirectional communication is possible. This external signal is supplied to the repeater from equipment external thereto which is normally controlled by the communication or message on the data link.

BRIEF DESCRIPTION OF THE DRAWING

While the present invention is particularly defined in the claims annexed to and forming a part of this specification, a better understanding can be had from the following description taken in conjunction with the accompanying drawing in which:

DETAILED DESCRIPTION

Figure 1:
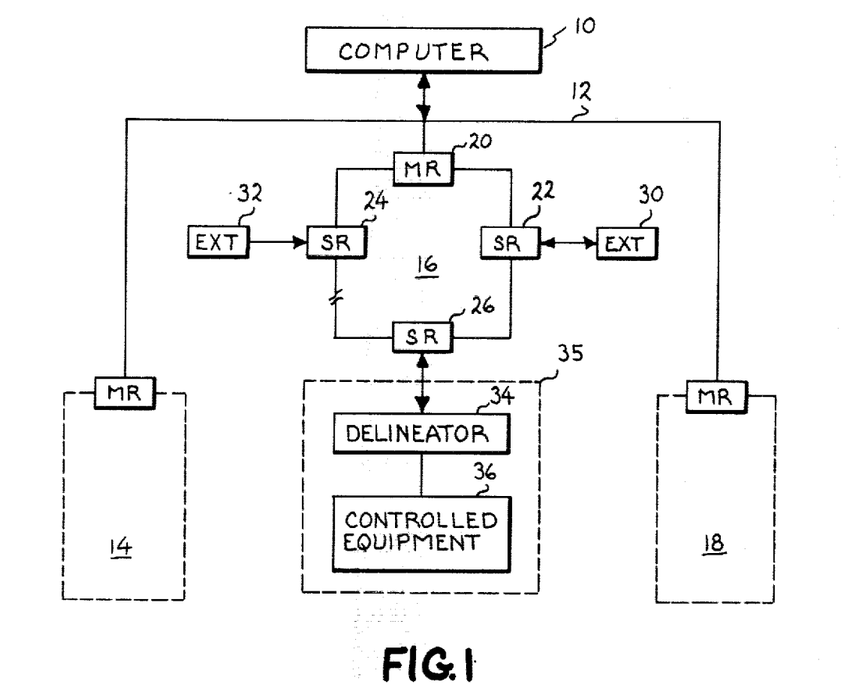
FIG. 1 is a major block diagram illustrating a typical process control system including a plurality of data communication links such as might employ the repeating station of the present invention.

Reference is now made to FIG. 1 which shows in major block diagram form a typical process control system involving data communications links such as might utilize the present invention.

As shown in FIG. 1, a computer 10 provides overall control functions to the system. Computer 10 is connected to a bus 12 to which are connected, in parallel, a plurality of data communication links. In FIG. 1, three such links 14, 16 and 18 are indicated and it is seen that each of these links is of the closed loop type. Link 16 is shown in greater detail and it is seen that the link includes a plurality of repeater stations, in the present instance a master repeater 20 and three slave repeaters 22, 24 and 26. Each of the repeaters is connected to an external piece of equipment which may be any appropriate type in accordance with the overall system being controlled, such as a motor drive. As a further example, an external equipment could be another computer. In FIG. 1, slave repeaters 22 and 24 are connected respectively to external equipments 30 and 32. Slave repeater 26 is connected to external equipment shown in greater detail and it is seen that the external equipment shown within the dashed line block 35 is comprised essentially of a delineator 34 and controlled equipment 36. Delineator 34 which forms the communication link between the slave repeater 26 and the control equipment 36 essentially provides the intelligence functions of dividing the message which the repeater provides it into bit times and bit fields and relaying them to the controlled equipment to effect the control thereof. The delineation of the message into bit times and fields is necessary so that when it is desired for the controlled equipment to communicate with the computer by way of the data link the proper insertion of data into a message frame may be accomplished. This will be further understood and explained as this description proceeds.

The recirculating data link such as is illustrated provides that a message is put onto the link by the master repeater 20. Assuming clockwise flow of information, slave repeater 22 first receives the message and repeats it for placement on the link to the slave repeater 26. Any intelligence within the message which is destined for the external equipment 30 will be given to it as the message passes through repeater 22 in a serial fashion. Likewise, if information is desired to be passed from the external equipment 30 by way of the data link, it will be done as the message passes through the repeater station 22. The same is true in each case within the overall system. Communication between the computer and the data links is by way of bus 12.

Figure 2:
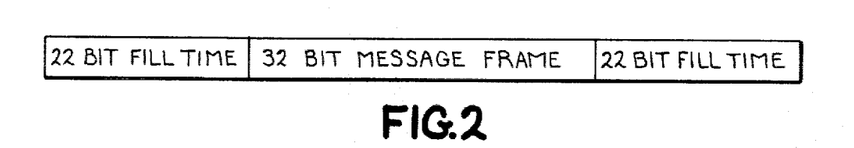
FIG. 2 illustrates the data format which was employed in conjunction with the actual implementation of the present invention.

While any number of formats could be employed, FIG. 2 illustrates that which was actually utilized in the implementation of the present invention. As shown in FIG. 2, it is seen that the format is comprised of a 32 bit message frame and a subsequent 22 bit fill time. The next data transmitted over the link would be a second 32 bit message frame followed by 22 bits of fill time. The implementation was thus a continuous modulation type system with the 22 bit fill time being appended to message frames to allow the external equipment such as 30, 32 and 35 time to perform and respond before the next message appears. The fill time was a 22 bit repeating series; i.e., 00110011-00.

Figure 3:
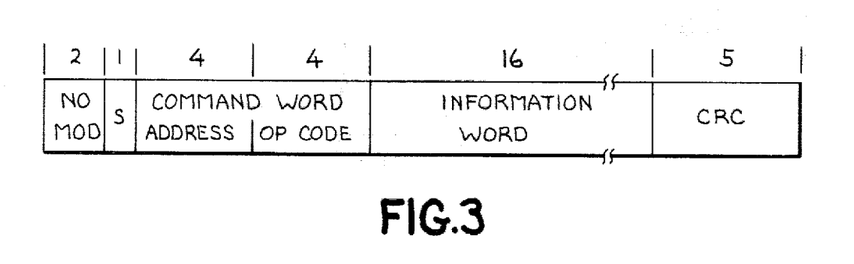
FIG. 3 illustrates the format of the message frame which was employed in conjunction with the actual implementation of the present invention.

The format of the 32 bit message frame is shown in FIG. 3. It was earlier indicated that the system provided continuous modulation on the data link and this is essentially true with the possible exception as shown in FIG. 3 that the first two bits of the message frame contained no modulation. This no modulation period served as an indication of the beginning of the message frame. The next bit of the message frame is a one bit synchronization bit which is always a binary 0. This is followed by an 8 bit command word comprised of a 4 bit address byte and a 4 bit op-code byte. The address byte identifies the particular slave station being addressed and the opcode byte identifies the operation to be performed. The op-codes permit addresses and information destined to and from the external devices apart from the information word. The next 16 bits comprise that information word and can address or contain data to direct the operation of the external controlled equipment or may serve other purposes such as providing interrupt flags as earlier mentioned. The last 5 bits of the 32 bit message frame are the CRC bits (cyclic redundancy check), a form of message integrity checking well known in the art. In the particular implementation of the present invention, the CRC field was also used as a loop integrity check. This was achieved by sending out the message word with the CRC in one form and having a designated slave repeater of the loop invert the CRC such that when it was checked after being circulated through the loop the proper return of an inverted CRC field indicated loop integrity.

Figures 4, 5:
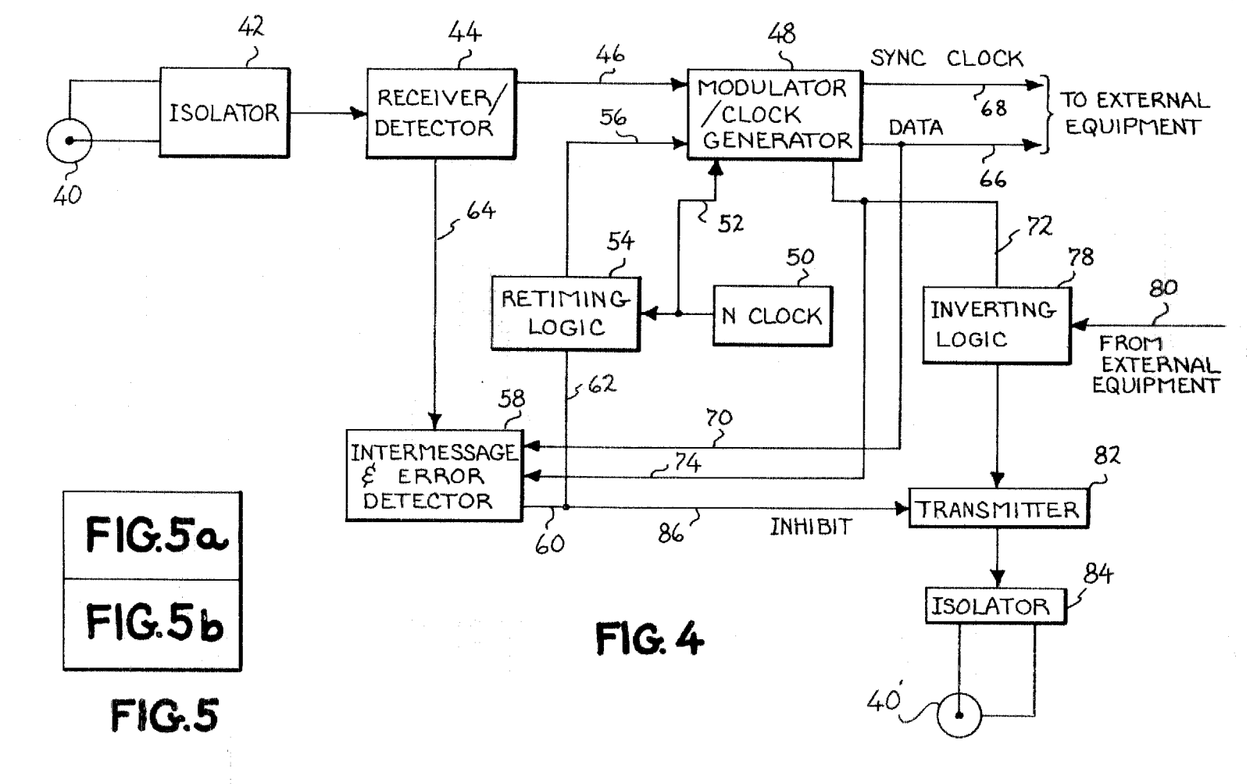
FIG. 4 is a major block diagram illustrating the repeater of the present invention in its preferred embodiment.
FIG. 5 illustrates the relationship of FIGS. 5a and 5b.

Reference is now made to FIG. 4 which shows, in major block diagram form, a data communications repeating station, or repeater, in accordance with the present invention. In the implementation of the present invention as illustrated in FIG. 1, both the master repeater and the slave repeaters were of the same configuration. In FIG. 4, the data on the communications link is supplied to a repeater by way of a coaxial cable 40 and is received by the repeater by way of a suitable isolator 42 which in turn supplies the signals to a receiver/detector 44. The receiver/detector serves to provide output signals by way of a line 46 to a modulator/clock generator 48. The signals on line 46 represent the data supplied to the receiver. Two further inputs are made to the modulator/clock generator. The first of these is from an N clock 50 which is a highly accurate but free running clock, such as a crystal controlled oscillator, which supplies a clocking signal at a multiple of the bit rate at which the data is supplied on the link. In the actual implementation of the present invention, the frequency of the N clock output was 16 times that of the bit rate. Since, as will be further explained with respect to FIG. 6, each data bit is comprised of a negative and a positive going pulse, the rate of the clock is, therefore, eight times the pulse repetition rate of the data on the link. Clock pulses from the N clock 50 are applied by way of the line 52 to the modulator/clock generator and an additional signal is supplied to that element from a retiming logic 54 by way of line 56.

The retiming logic 54 also receives the clock pulses from the N clock 50 and a further input from an intermessage and error detector circuit 58 by way of lines 60 and 62. The intermessage and error detector circuit 58 receives an input by way of the line 64 from the receiver/detector 44 and also receives two inputs from the modulator/clock generator 48 via lines 70 and 74. The modulator/clock generator 48 supplies data which has been reconstructed in the manner to be described to the external equipment (see FIG. 1) and also supplies a synchronization clock to that external equipment so that the equipment knows the exact timing within the repeater station. As shown in FIG. 4, data is furnished to the external equipment by line 66 and the synchronization clock signal is applied by way of line 68. Data on line 66 is supplied to the intermessage and error detector by way of line 70. The other signal applied to the intermessage and error detector circuit 58 from the circuitry 48 is the actual reconstructed data signal which appears on output line 72 of the modulator 48 and is applied by way of line 74 to the circuit 58. This data, as will be understood as this description proceeds, is the reconstruction data which is received by the repeater for application to the data link.

As described thus far, the intermessage and error detector circuit in response to its inputs will provide an output signal on line 60 which when applied by line 62 to the retiming logic in conjunction with the clock pulses from the clock 50 allows the retiming circuit to essentially begin a message time period of its own dependent upon the occurrence of the internal N clock pulses. The three inputs to the modulator/clock generator 48, that is the output of the retiming logic via line 56, the clock pulses via line 52 and the incoming data on line 46, provide the modulator/clock generator with sufficient information for that circuitry to reconstruct the message received but in its own time frame while dependent upon the other signals. This data then is applied by way of line 72 to an inverting logic circuit 78. The inverting logic 78 receives, selectively, an input signal via line 80 from the external equipment and serves to do nothing more than, in response to the presence of a signal on line 80, invert appropriate portions of the serial data message on line 72 prior to its being supplied to a suitable transmitter 80 for application by way of an isolator 82 back onto the data link; i.e., coaxial cable indicated at 40'. If the external equipment is not attempting to originate a communication with other system components, the inverting logic 78 merely passes the signal on line 72 to the transmitter 80.

The last depiction to be discussed with respect to FIG. 4 concerns the inhibit signal applied by way of line 86 from the intermessage and error detector circuit 58 to the transmitter 82. This circuit detects the intermessage no modulation gap and also prescribed illegal pulse modulation patterns in the data stream. When one of these conditions is detected, an inhibit signal is applied to the transmitter 82 by line 86 and prevents the transmitter from transmitting. This will result in a no modulation period within the data stream which can be interpreted as an error or an intermessage gap when taken in context with the modulation which follows.

Figure 5A:
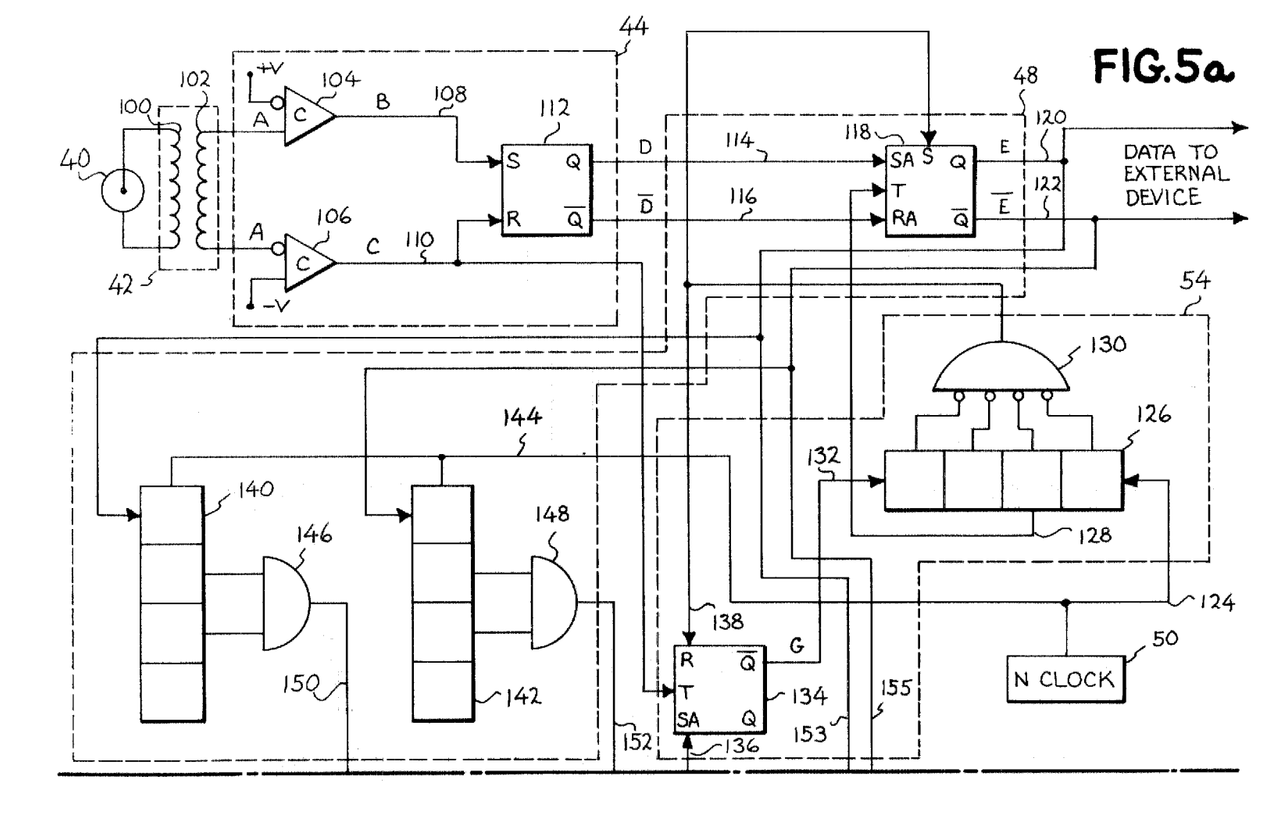
FIGS. 5a and 5b taken together as depicted in FIG. 5 illustrate in detail the repeater of the present invention.
Figure 5B:
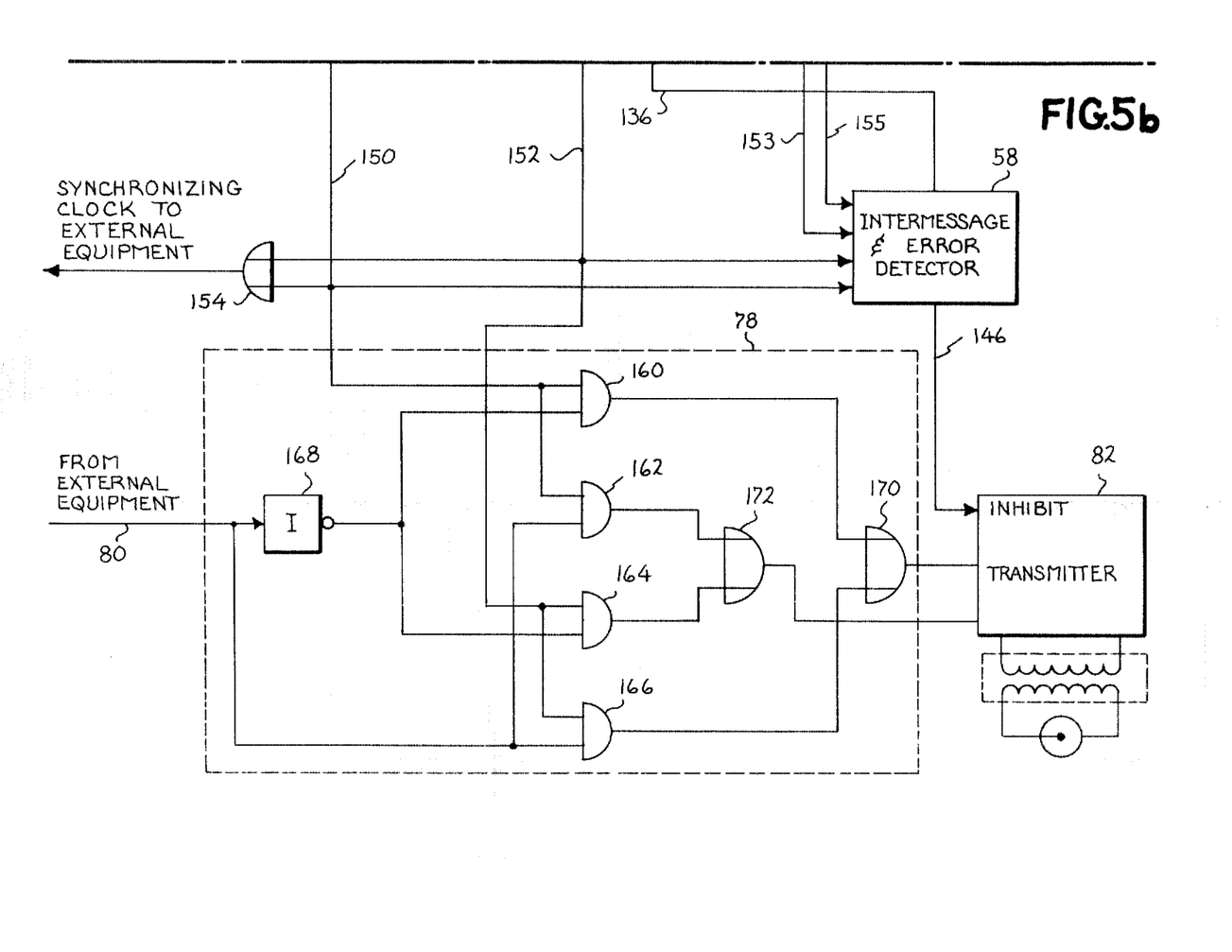
Figure 6:
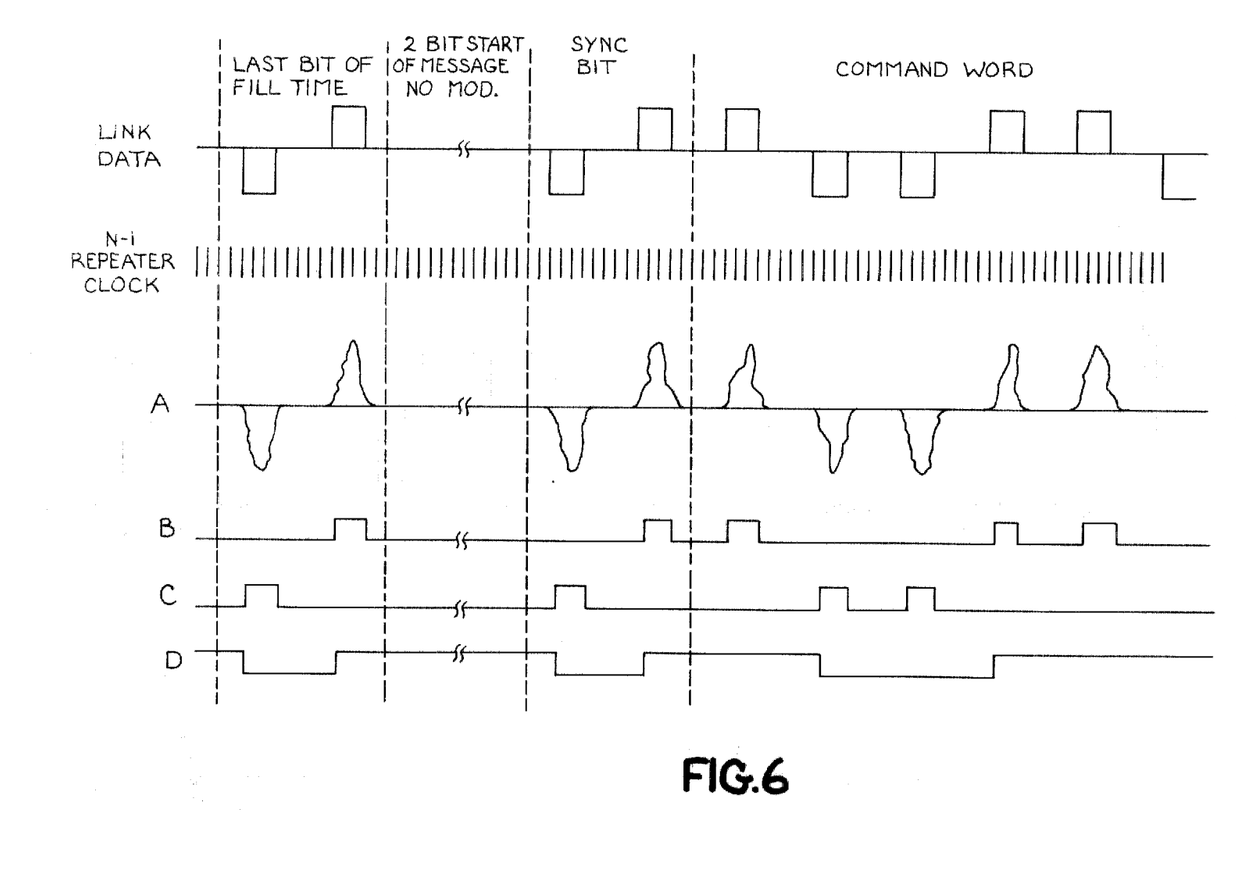
FIGS. 6 and 7 are timing diagrams helpful in the understanding of the present invention; and, FIG. 8 shows in greater detail a one of the components shown only in block form in FIG. 5b.
Figure 7:
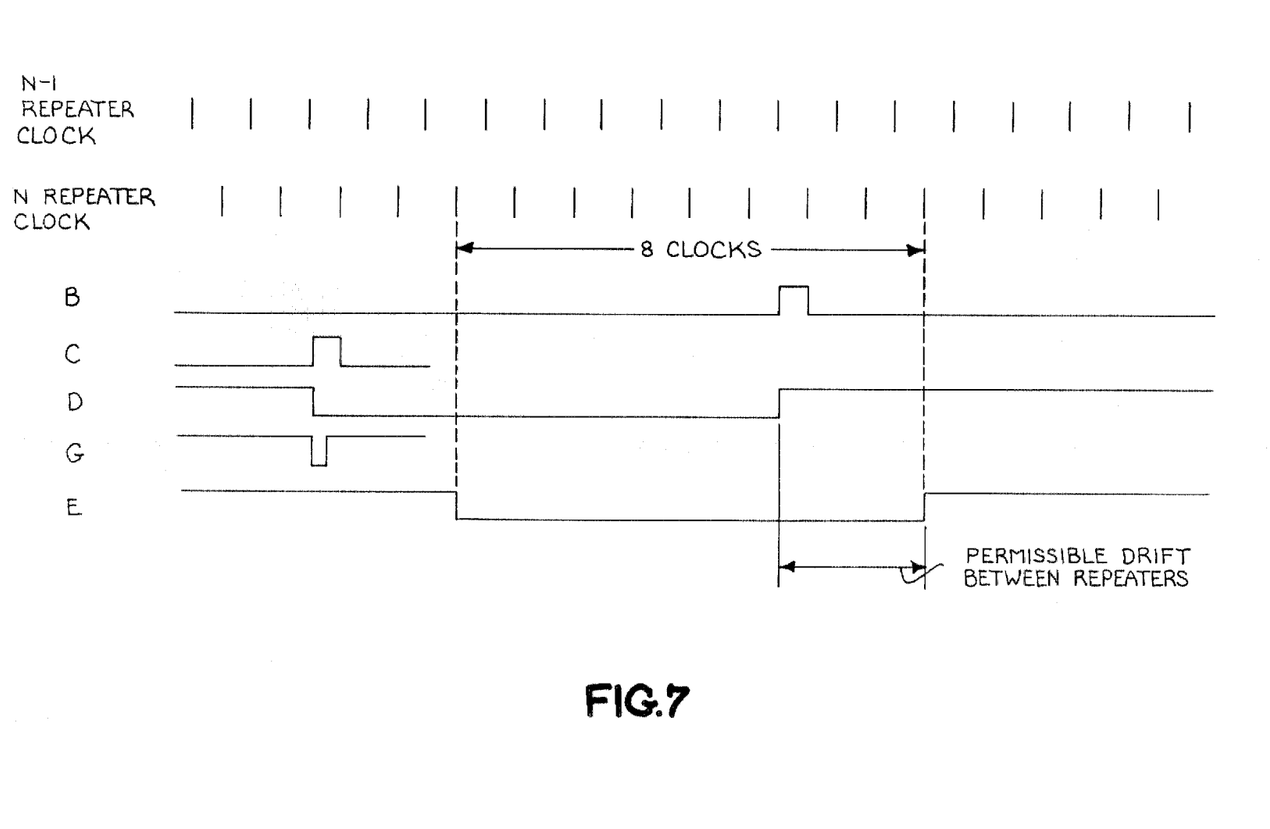

For a more complete understanding of the repeater of the present invention, particular reference is made to FIGS. 5a and 5b which when taken together as shown in FIG. 5 and taken in conjunction with the timing diagrams of FIGS. 6 and 7 show in detail the preferred structured embodiment of the repeater of the present invention. In the actual implementation of the present invention, data was transmitted over the link using a two pulse system to designate a binary bit; i.e., either a binary 1 or a binary 0. Binary 1's were defined as having first a positive and then a negative going pulse while binary 0's were defined as having first a negative going pulse and subsequently a positive going pulse. Referencing now FIG. 6, the upper line labeled "data link" depicts a portion of a typical data stream which may have been placed on the link by a repeater N-1 (i.e., the preceding repeater in the link). The second depiction of FIG. 6 is the N-1 repeater clock which is the clock associated with the repeater placing the message onto the data link. Note that the pulses shown in the upper line are synchronized with that clock. In accordance with the previous discussion, the first data shown in the link data line is a binary 0 which corresponds to the last bit of the fill time; i.e., a binary 0. Following that last fill time bit (reference FIGS. 2 and 3) there is a 2 bit start of the message or no modulation period after which there appears a binary 0 synchronization bit. The command word follows the synchronization bit and is shown as starting with the binary configuration 1, 0, 1. Line A of FIG. 6 demonstrates that, even though the data was placed on the link as sharply defined pulses as depicted in the data link line, by the time the data reaches the next station (Station N) it may be seriously degraded. The pulses may no longer be sharp, well-defined pulses but may be irregular and it is this type of signal which is normally presented to the repeater. Referencing now FIGS. 5a and 5b, the signals on the link (coaxial cable 40) are presented to the repeater by way of an isolator circuit 42 which may be a simple isolation transformer having primary winding 100 and a secondary winding 102. Thus, at the output of the secondary winding 102 the signals A of FIG. 6 are present. These relatively positive and negative going signals are applied, respectively, to the noninverting and inverting inputs to two comparator circuits (e.g., operational amplifier circuits) 104, 106. The inverting input of comparator 104 is connected to a reference source of positive potential $+V$ while the noninverting input of comparator 106 is connected to a negative reference potential $-V$. Thus, there appears at the output of comparator 104 on line 108 a pulse whenever the signal at the inverting input of the comparator 104 is more positive than the reference voltage. This will be a positive going pulse of somewhat indeterminent width as depicted by trace B in FIG. 6. In a similar manner, when a relatively negative going pulse is present on the transformer secondary 102, comparator 106 will provide an output on line 110 which is a pulse of again somewhat indeterminent width as shown by trace C in FIG. 6. The B and C outputs on lines 108 and 110 are applied respectively to the set and reset terminals of a bistable multivibrator or flip-flop 112 having Q and $\overline{Q}$ outputs. Flip-flop 112 serves as a latch and will toggle in accordance with the occurrence of the B and C inputs. The Q output latch signal of flip-flop 112 appears on line 114 and is shown in FIG. 6 as trace D. The D signal will rise to a high value; i.e., its true state, with the occurrence of the B pulse and will go to a low value or a false state at the first following occurrence of a C pulse. The $\overline{Q}$ output latch signal on line 116 will be the complement of the D signal ($\overline{D}$) and has not been shown.

The two signals on lines 114 and 116, signals D and $\overline{D}$ are applied, respectively, to the SA and RA terminals of a trigger flip-flop 118 which further includes a trigger input T and a set input S. Forgetting for the moment the set terminal S, trigger flip-flop 118 can change its state upon the simultaneous application of signals to one of its terminals SA or RA and the trigger input T. The Q and $\overline{Q}$ outputs of flip-flop 118 are complementary timing signals, applied on output lines 120 and 122, designated E and $\overline{E}$, respectively, and are supplied as data to the external device or equipment. These outputs contain the information of the original message put out by the preceding repeater; i.e., the N-1 repeater, and are retimed in accordance with the timing of the present repeater or the N repeater. The method by which this is achieved will now be explained.

Referring to FIG. 7, it is seen that the N-1 repeater clock is again shown but in this instance on a much expanded scale. Also shown is a clock output of the present or N repeater; that is, with respect to FIG. 5a, the N clock 50. It is noted that the clock pulses produced by the N repeater clock are not in synchronism with the N-1 repeater clock, a possibility earlier indicated. Returning to FIGS. 5a and 5b, the N clock pulses from clock 50 are applied by way of a line 124 as the input of a first counter 126 within the retiming logic 54. Counter 126 is preferably that which is known as a "Johnson counter" which has the counting capability or feature of only changing one stage with each occurrence of an input clock. Thus, in a four stage counter as shown in FIGS. 5a, the content sequence would be as shown in Table 1 below.

TABLE 1

```
0 0 0 0
1 0 0 0
1 1 0 0
1 1 1 0
1 1 1 1
0 1 1 1
0 0 1 1
0 0 0 1
0 0 0 0
```

As shown in FIG. 5a, line 128 is connected to the third stage of the Johnson counter 126. This line serves as the edge-trigger input to flip-flop 118. In accordance with Table 1, it is seen that the signal on line 128 will be a binary 1 thus enabling the flip-flop 118 for one-half of a complete cycle of the Johnson counter; that is, whenever the third bit is a binary 1. The four stages of the Johnson counter are connected to a negative AND gate 130 which has its output connected to the S or set terminal of flip-flop 118. Thus, whenever the Johnson counter contains all 0's, the negative AND gate 130 will output a signal which will serve to set flip-flop 118. The last input to the Johnson counter is by way of a line 132 which is the $\overline{Q}$ output of a flip-flop 134, also within the retiming logic 54. The signal on this line, designated G, serves to reset the Johnson counter 126 and is the result of an input to its trigger terminal T (the C signal on line 110) taken in conjunction with an input via line 136 from the intermessage and error detector circuit 58 applied to the SA terminal of the flip-flop 134. The last input to flip-flop 134 is the output of negative AND gate 130 which is applied to the R or reset terminal of that flip-flop and causes that flip-flop to reset regardless of the condition of the input to the trigger terminal.

FIG. 7 demonstrates the retiming function of the present invention as thus far described. As earlier indicated, the upper two traces or graphs show that the clocks between two successive repeater stations in the data link need not and may not, in fact, be in synchronization. This figure, shown in a much greater expanded scale than FIG. 6, shows the C signal on line 110 may appear at some time other than in exact synchronization with either clock but would be more closely related to the N-1 repeater clock which generated the signal which eventually resulted in the C signal. As in the case of FIG. 6, with the occurrence of the C signal, the D signal goes to the false state. Also, with the occurrence of the C signal, the flip-flop 134 is enabled by the application of a signal to its trigger terminal and, because line 136 is also high at this time due to the fact that there existed an intergap no modulation period thus enabling line 136 as will be fully understood with respect to the description of the intermessage and error detector circuit 58, flip-flop 134 will go to its set state such that the output from the $\overline{Q}$ terminal signal G will go to the low value. This signal is then applied as a reset signal to the Johnson counter 126 setting that counter in its all zero state, enabling the negative AND gate 130 and applying a reset signal via line 138 to the reset (R) terminal of flip-flop 134 resetting that flip-flop resulting in a very narrow pulse shown as G in FIG. 7.

With the resetting of the Johnson counter 126, the signal on line 128 is low thus inhibiting flip-flop 118. When the counter 126 reaches the count of 1110 at the occurrence of the third N repeater clock, line 128 will come high enabling flip-flop 118. Since the $\overline{D}$ signal is true at this time, flip-flop 118 will change state with the E signal going to the false state. The output of the flip-flop 118 will as is shown in FIG. 7 remain now in a stable state for eight N clock periods since there cannot be a change in the data link signal prior to the occurrence of the fourth clock signal after the last change of state, this representing the period during which the signal on line 128 is high thus enabling flip-flop 118 while at other periods of time it is low.

Continuing with the FIG. 7 showing, it is seen that, taken in conjunction with FIG. 6, at the time of the occurrence of the next B signal, the D signal will again go high. At the beginning of the next enable signal on line 128, the E signal will go true. The period existing between the appearance of the D and E signals is a permissible drift area between repeaters which allows for discrepancies in timing periods and as is seen in the present example amounts to almost 2.5 clock periods.

Returning again to FIGS. 5a and 5b, it is seen that the E and $\overline{E}$ outputs of flip-flop 118 of the modulator/clock generator 48 serve not only as data signals to the external equipment but also serve as reset signals, respectively, to two additional Johnson counters 140 and 142 within the generator 48. Also, applied to these counters are the clock pulses from the clock 50 by way of a line 144. Thus, counter 140 will count clock pulses except during the true periods of the E signal and Johnson counter 142 will count clock pulses except during the true periods of the $\overline{E}$ signal. A first AND gate 146 is connected to the two intermediate stages of Johnson counter 140 and a second AND gate 148 is connected to the two intermediate stages of the Johnson counter 142. As such, in accordance with the designation of signals E and $\overline{E}$ which correspond respectively to positive and negative going pulses which appear as an input on the coaxial cable 40, there will appear at the outputs of the gates 146 ad 148 (lines 150 and 152) square wave pulses which are a reconstruction of that originally sent from the N-1 repeater station.

The pulses on lines 150 and 152 serve a variety of purposes. First of all, they are combined in an OR gate 154, the output of which serves as the synchronizing clock to external equipment. They are also supplied as two inputs to the intermessage and error detector circuit 58 which also receives the E and $\overline{E}$ signals from the flip-flop 118 via lines 153 and 155. The exact configuration of the circuit of block 58 will be described with respect to FIG. 8. Suffice it to say at the present time that a signal appears on its output line 136 as earlier discussed when either or two conditions occur. The first of these is during an intermessage gap which results in a count of three in counter 140. The second occurrence is when there actually exists three consecutive positive pulses which would indicate an error in the data transmission. The second output of the intermessage and error detector circuit 58 is the output on line 146 which serves to inhibit the transmitter 82 such that when this signal is high, the transmitter is prevented from operation. This signal occurs when either the above conditions for 136 exist or when three consecutive negative pulses appear in the data train. This will be explained in greater detail with respect to FIG. 8.

Returning to the outputs on lines 150 and 152, if a pure repeating station were desired these inputs could be applied directly to the transmitter 82 for placement on the output coaxial calbe 40' by way of a suitable transformer isolator 84 without modification. In the preferred embodiment, however, it is desired to utilize the repeater to transmit intelligence from an external source and to this end there is provided an inverting logic 78 which allows for the inversion of the signals on lines 150 and 152 prior to their supply to the transmitter 82.

To provide this inversion a relatively simple inverting logic circuit is provided. Line 150 serves as one input to a pair of AND gates 160 and 162, while the line 152 serves as one input to two AND gates 164 and 166. The signal directly from the external circuit via line 80 serves as a second input to the two gates 162 and 166 while that signal inverted by an inverter 168 is applied as the second input to the two AND gates 160 and 164. The outputs of gates 160 and 166 are combined by an OR gate 170 and serve as one input to the transmitter 82 while the outputs of the two AND gates 162 and 164 serve as inputs to an OR gate 172 the output of which is the second input to the transmitter 82. Thus, if at any particular time the external equipment wants to invert the status of the signals on lines 150 and 152, the application of the binary 1 on line 80 will achieve this function. In the absence of this signal on line 80 the signals on line 150 and 152 will pass directly through the inverting logic 78 for application to the transmitter to be placed on the data link as earlier described.

Figure 8:
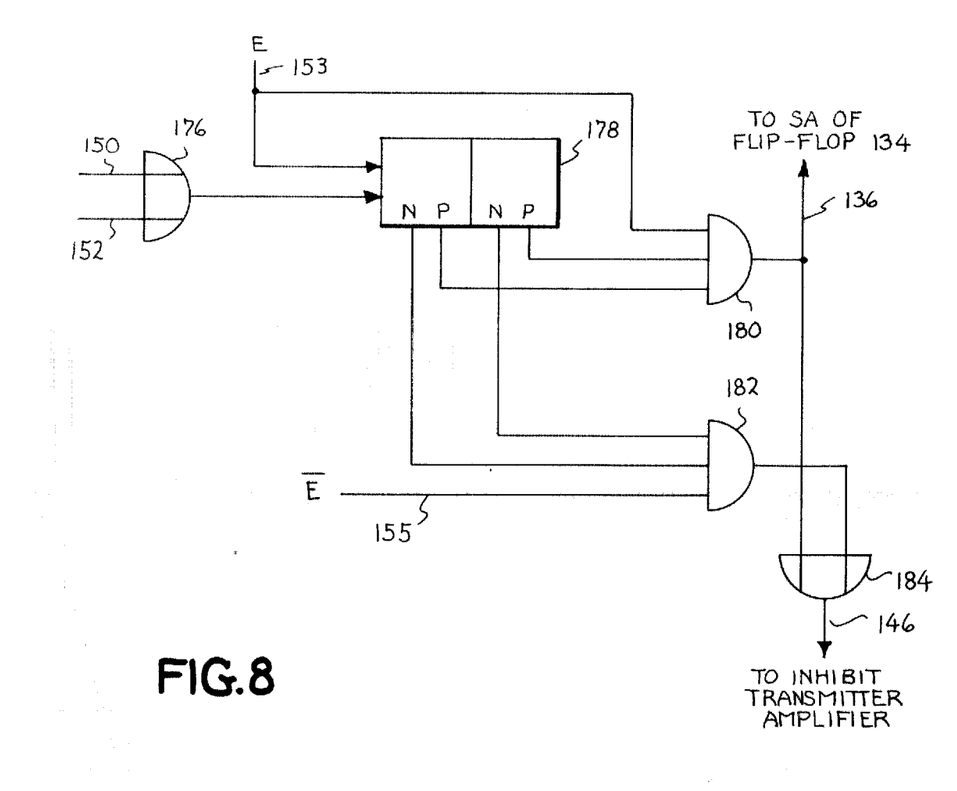

FIG. 8 shows the internal structure of the intermessage and error detector circuit 58. It will be remembered that it was stated that a signal appears on line 136 when three consecutive positive pulses appeared in the message or at the occurrence of its equivalent, so far as the two Johnson counters 140 and 142 are concerned, of the no modulation intermessage gap. The second signal on line 146 to the transmitter 82 occurs when the conditions for a signal on line 136 are met or when three consecutive negative pulses occur in the data stream. In FIG. 8 it is seen that the two signals on lines 150 and 152 are ORed by a suitable OR gate 176 and applied as a clock input to a two place counter 178. The other enabling input to the counter is the E signal from the flip-flop 118. Each of the stages of the two stage counter 178 has a negative (N) and a positive (P) output terminal. The two positive outputs of the counter are ANDed in a suitable gate 180 with the E signal from line 118 while the two N outputs of the counter are ANDed in a gate 182 with the $\overline{E}$ output of gate 118. The output of gate 180 is connected to line 136 and from the foregoing description it is seen that with the occurrence of three consecutive positive pulses this output will be high. Line 136 is also high in the case of no modulation since the $\overline{E}$ signal (referring to FIG. 5a) will remain low thus not resetting the Johnson counter 142 for the requisite period of time thus allowing it to count in the same manner as it would with three positive pulses. Three negative consecutive pulses being counted by the Johnson counter 140 (FIG. 5b) during the absence of the $\overline{E}$ signal will enable gate 182. As shown in FIG. 8, the outputs of gates 180 and 182 are ORed by gate 184 to provide the output signal 146 to the transmitter amplifier 82 as shown in FIG. 5b.

Thus, there is seen that there has been shown and described a very simple repeating station which does not require expensive phase lock loops and continuous synchronization with a data line to reconstruct data presented thereto.

While there has been shown and described what is at present considered to be the preferred embodiment of the present invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:

1. For use in a digital data communication link, a repeating station for selectively forwarding serially transmitted digital data including incoming messages of defined length and identifiable beginning comprising:
   (a) detecting means for receiving incoming digital data and for providing data signals representative thereof;
   (b) a free running internal clock for providing clocking signals at a predetermined frequency which in a multiple of the bit rate of said transmitted digital data;
   (c) retiming logic responsive to said clocking signals for generating timing signals;
   (d) modulating means substantially instantaneously responsive to said data signals and said timing signals to reconstruct the incoming digital data in a time relationship governed by said clocking means to thereby provide reconstructed digital data signals; and,
   (e) transmitting means for transmitting said reconstructed digital data signals on said data communication link.

2. The invention in accordance with claim 1 further including means responsive to prescribed bit patterns of said reconstructed digital data to inhibit the operation of said transmitting means.

3. The invention in accordance with claim 1 further including means responsive to a prescribed bit pattern of said reconstructed digital data to initialize said timing logic.

4. The invention in accordance with claim 1 further including logic means responsive to an externally supplied inverting signal to selectively invert the state of individual bits of said reconstructed digital data.

5. The invention in accordance with claim 4 further including means to supply said reconstructed digital data signals to external equipment supplying said inverting signal.

6. The invention in accordance with claim 1 wherein said detecting means comprises first and second comparators responsive, respectively, to relatively positive and negative going incoming digital data.

7. The invention in accordance with claim 1 wherein said retiming logic comprises a recycling counter means for counting said clock pulses and for providing a designated output signal to said modulating means during a prescribed portion of each cycle of said counter.

8. The invention in accordance with claim 1 further including means to supply said reconstructed digital data signals as synchronizing clock signals to external equipment associated with said repeating station.

9. The invention in accordance with claim 1 further including means to supply said reconstructed digital data signals as synchronizing clock signals to external equipment associated with said repeating station and wherein said repeating station further includes logic means responsive to an inverting signal supplied by the external equipment to selectively invert the state of individual bits of said reconstructed digital data.

10. A repeating station for a data communications link over which digital messages, comprised of relative positive and negative going incoming signals of a frequency, of defined length and having an identifiable beginning are transmitted comprising:
 (a) means for detecting said relative positive and negative going signals and for providing output signals indicative thereof;
 (b) latch means responsive to said output signals for providing latch signals alternately with the occurrence of said output signals;
 (c) clock means for providing clock signals at a frequency equal to a multiple of the frequency of said positive and negative going signals;
 (d) first recycling counter means for repetitively counting a predetermined number of clock signals and for providing a trigger signal during a defined portion of each count;
 (e) first bistable means responsive to said latch signals and said trigger signal for providing complementary timing signals and for providing a designated one of said signals upon the occurrence of a reset signal;
 (f) first logic means for providing said reset signal in response to a designated count of said first counter means;
 (g) second and third recycling counter means for counting clock signals except during the occurrence of a respective one of said complementary timing signals, said second and third counter means being held in the zero condition during the occurrence of its respective timing signal;
 (h) second and third logic means responsive respectively to designated contents of said second and third counter means for providing output signals representative of said incoming signals;
 (i) transmitter means for selectively applying said output signals to said data link;
 (j) intermessage and error detector means responsive to either of two prescribed patterns of said outgoing signals and said complementary timing signals to generate an inhibit signal to inhibit said transmitter means and to a one of said prescribed patterns and a one of said complementary timing signals to provide a second signal to identify the beginning of a message; and,
 (k) second bistable means operative to generate a reset pulse for resetting said first recycling counter means to a fixed content in response to said signal, said reset signal and a one of said latch signals.

11. The invention in accordance with claim 10 further including logic means responsive to an externally applied inverting signal for selectively inverting the states of said outgoing signals.

12. The invention in accordance with claim 10 wherein said reset signal from said first logic means is generated in response to said fixed count of said first counter means.

13. The invention in accordance with claim 10 wherein said detection means comprises first and second comparators responsive, respectively, to positive and negative going incoming signals.

14. The invention in accordance with claim 10 wherein each of said counter means has four stages only one of which is changed with each occurrence of a clock signal.

15. The invention in accordance with claim 10 wherein said intermessage and error detector means includes means to generate said inhibit signal in response to a specified consecutive number of like outgoing pulses of either relative polarity and to generate said second signal only in response to a specified consecutive number of like outgoing pulses of a one of said relative polarities.

16. The invention in accordance with claim 10 further including means to supply the output signals of said second and third logic means as synchronizing clock signals to external equipment associated with said repeating station.

17. The invention in accordance with claim 10 further including means to supply the output signals of said second and third logic means as synchronizing clock signals to external equipment associated with said repeating station and wherein said repeating station further includes logic means responsive to an inverting signal supplied by an external equipment to selectively invert the states of said outgoing signals.

* * * * *